Oct. 25, 1960        H. D. BURDETT        2,957,534

WHEELED AGRICULTURAL VEHICLE WITH TRACTION UNIT

Filed Aug. 13, 1957        2 Sheets-Sheet 1

*INVENTOR.*
HAROLD D. BURDETT

Oct. 25, 1960 H. D. BURDETT 2,957,534
WHEELED AGRICULTURAL VEHICLE WITH TRACTION UNIT
Filed Aug. 13, 1957 2 Sheets-Sheet 2
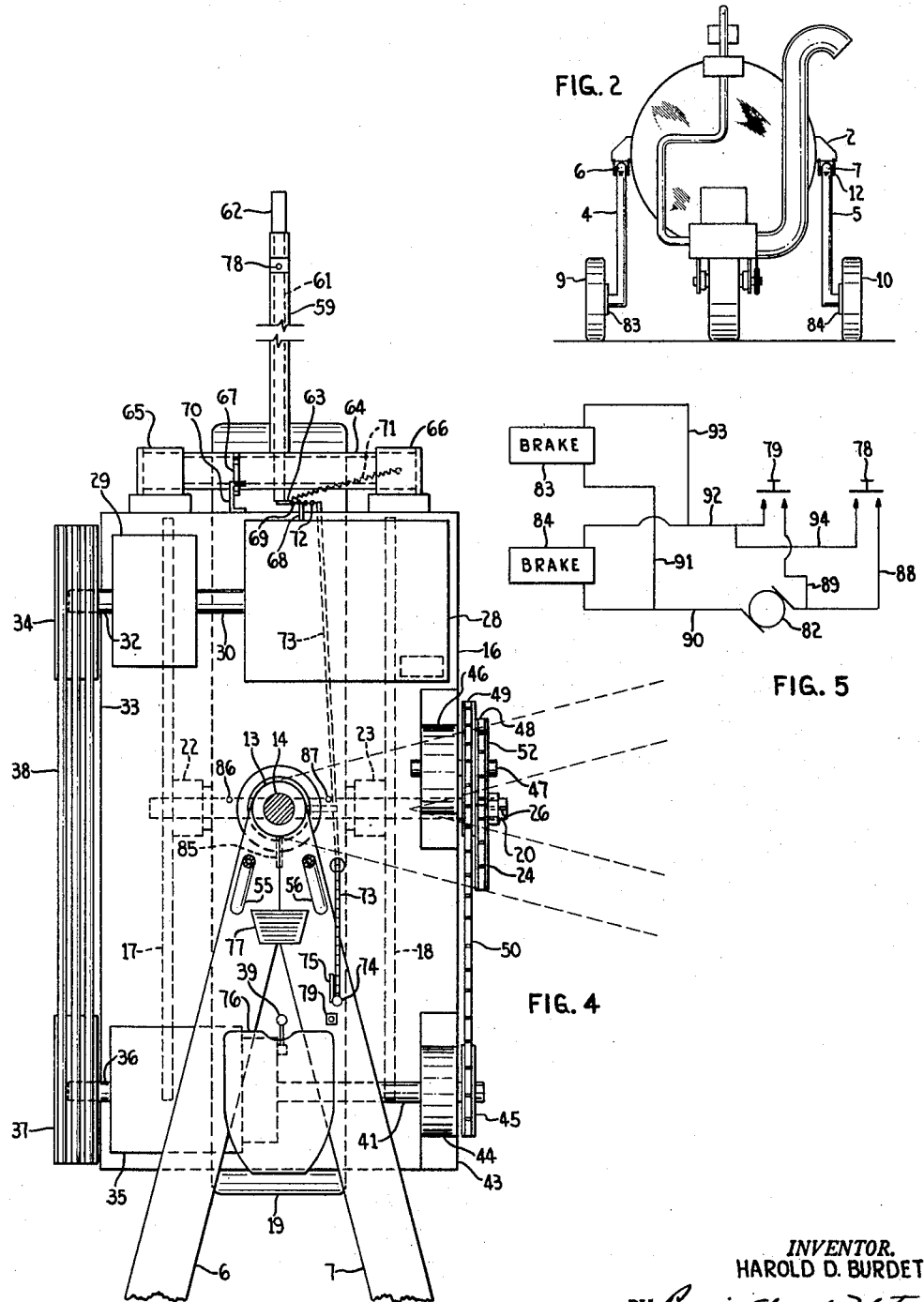
INVENTOR.
HAROLD D. BURDETT

United States Patent Office 2,957,534
Patented Oct. 25, 1960

2,957,534

WHEELED AGRICULTURAL VEHICLE WITH TRACTION UNIT

Harold D. Burdett, Phoenix, Ariz., assignor to The Hub Manufacturing Corporation, a corporation of Arizona Filed Aug. 13, 1957, Ser. No. 677,917

3 Claims. (Cl. 180—19)

The present invention relates to traction units and vehicles and is more particularly concerned with power-driven traction units and vehicles for agricultural services such as the harvesting of cotton.

The present application is a continuation-in-part of my prior application, Serial No. 531,452, filed August 30, 1955, now abandoned and is related to my copending application, Serial No. 677,906 filed concurrently herewith.

Pneumatic cotton pickers such as those disclosed in my above-mentioned, pending applications are to be propelled at a speed which generally coincides with the average speed at which the individual picking nozzles are advanced along the rows of cotton. Therefore, under conditions of varying yields of cotton within the same field, or with other variations which cause changes in the rate at which the nozzles may be advanced along the rows, it is desirable to modify the groundspeed of the picker accordingly.

Prior attempts at regulation of the groundspeed of pneumatic cotton pickers having individual picking nozzles have involved the continuous attention of an operator, or required sufficient attention on the part of an individual as to prevent his doubling in service as a picking laborer.

The present invention provides a power-driven traction unit and vehicle which may carry an agricultural unit, such as a cotton picker, and which may be moved intermittently or continuously along a row of plants from which the crop is to be harvested. The traction unit is so arronbed that it may be controlled by a picking laborer, eliminating the need for a separate vehicle operator, and otherwise increasing the overall efficiency of the operation.

In general, the preferred form of the invention, as embodied in a cotton picker, comprises a traction unit supporting the forward end of a frame or chassis having a pair of longitudinal rails on which is mounted means for supporting a pneumatic cotton picking apparatus. The chassis has a pair of legs, at the rear end of the rails, each of which supports a rotatably-mounted ground wheel. The vehicle chassis is supported on the traction unit by a supporting member provided at the forward end of the chassis.

The traction unit comprises a traction wheel mounted on a frame depending from a platform which has a vertical shaft thereon in engagement with the supporting member in a manner permitting oscillation of the platform about the axis of the shaft. A motor is mounted on the platform and drives the traction wheel through a centrifugal clutch, a change-speed transmission, and suitable intermediate and final power trains, all mounted on the platform.

A steering arm is hinged on the forward end of the platform and, in its lower position on the hinge, extends forward, at a height convenient for manual operation by a person on the ground forward of the unit, to a point generally in line with the picking nozzles. The steering arm is hollow and is provided with a rod therethrough which terminates in a control handle at its forward end, and extends beyond the steering arm at its rearward end to connect with the motor throttle through a chain linkage, so that a picking laborer directly forward of the arm may cause the picker to follow his progress along the cotton row.

The upper end of the vertical shaft on the traction unit platform is provided with a steering mechanism having a steering wheel extending to a position adjacent a seat on the vehicle frame. A remote throttle control cable, being connected to the throttle itself by a chain, extends rearwardly from the motor and is secured to a throttle quadrant adjacent the seat to permit transport of the vehicle to and from storage.

The rear wheels are provided with electrically-actuated brakes remotely controlled by a pair of parallel-connected switches adjacent the throttle quadrant and the control handle, respectively, to permit positioning and deceleration of the unit during picking and transporting, respectively.

A better understanding of the invention may be derived from the following description and drawings in which:

Fig. 2 is an end view of Fig. 1;

Fig. 4 is a plan view taken along the lines 4—4 of Fig. 3; and

Fig. 5 is a schematic wiring diagram of the brake circuit.

Figure 1:
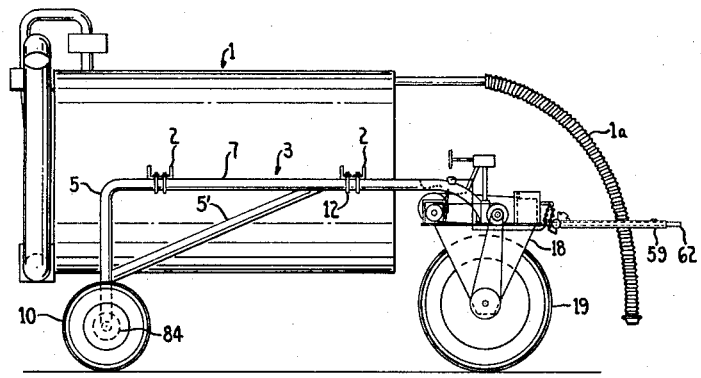
Fig. 1 is a side elevation of an embodiment of the invention applied to a cotton picker.
Figure 3:
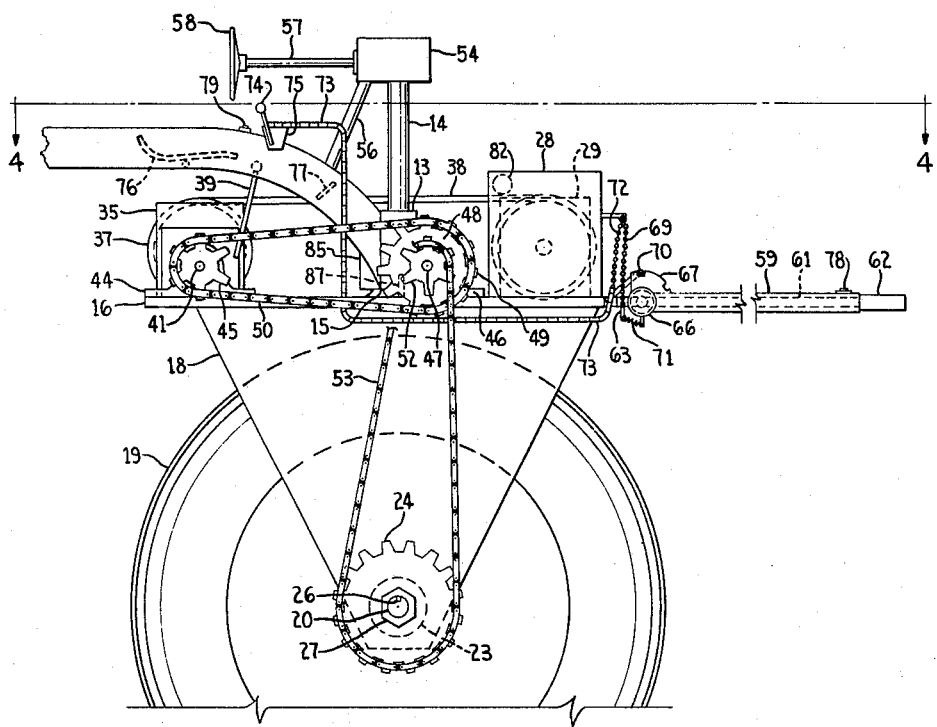
Fig. 3 is an enlarged side view of the traction unit of Fig. 1.

As shown in Figs. 1 through 4, a cotton picker 1 having picking hoses 1a is supported by integral shelves or mounts 2 on a metal frame or chassis 3. The chassis 3 comprises a pair of legs 4 and 5 which extend forwardly at their upper ends as rails 6 and 7, respectively. The legs 4 and 5 carry rotatably-mounted wheels 9 and 10, respectively, and are braced on the rails 6 and 7 by means of braces 5', respectively. Each of the mounts 2 is provided with a pair of U bolts 12 which bind the mounts 2 against the rails to secure the picker thereto.

The rails 6 and 7 are poined at their forward end and terminate in a sleeve 13, which receives a vertical shaft 14 therethrough from a bearing surface 15 on a traction unit platform 16. The lower edges of the sleeve 13 and the bearing surface 15 form a thrust bearing permitting oscillation of the platform 16 about the axis of the vertical shaft 14. Below the platform 16, a frame comprising a pair of wheel supports 17 and 18 carries a traction wheel 19 on a shaft 20 which is centered below the vertical shaft 14. The shaft 20 is mounted in suitable bearings 22 and 23 in the wheel supports 17 and 18, respectively, and extends laterally beyond the wheel support 18 to reveive a drive sprocket 24 secured against a shoulder thereon by a key 26 and locknut 27.

The forward surface of the platform 16 carries a self-contained power unit or gasoline motor 28 and a centrifugally-engaged clutch 29, of conventional design, directly coupled to the output shaft 30 of the motor 28. A clutch output shaft 32 extends laterally from the centrifugal clutch 29, extends beyond the edge 33 of the platform, and carries a multiple sheave 34 secured thereon by key and setscrew means (not shown).

The rearward surface of the platform 16 carries a transmission 35 having a lateral input shaft 36 thereon extending parallel to the clutch output shaft 32. The output shaft 36 overhangs the edge 33 of the platform and is provided with a multiple sheave 37 secured thereon by means of a key and setscrew (not shown) in alignment with the multiple sheave 34 and in engagement therewith through a plurality of V belts 38.

The transmission 35 is provided with a shifting lever 39 and an extended output shaft 41. The output shaft 41 overhangs the edge 43 of the platform and is supported adjacent the edge 43 by a pillow block 44. The free end of the output shaft 41 is provided with a drive sprocket 45 secured thereon by means of a key and setscrew (not shown). Spaced forward of the pillow block 44 and adjacent the edge 43, a bearing block 46 carries an idler shaft 47 extending laterally beyond the edge 43 and parallel to the output shaft 41. The free end of the idler shaft 47 is provided with a double sprocket 48 secured thereto by means of a key and setscrew (not shown) with its inboard sprocket 49 in alignment with and engaging the drive sprocket 45 through a roller chain 50, and the outboard sprocket 52 in alignment with and engaging the sprocket 24 of the traction wheel 19 through a roller chain 53, for the transmission of power to the traction wheel 19.

The vertical shaft 14 is oscillated by a gear box 54 arranged at its upper end. The gear box is rigidly held in position, with respect to the chassis, by braces 55 and 56 extending from the rails 6 and 7, respectively, and is provided with a rearwardly-extending steering shaft 57 having a steering wheel 58.

At its forward edge, the platform 16 is provided with a hollow steering arm 59 having a control rod 61 extending therethrough and terminating in an integral control handle 62 at its forward end, and an L shaped extension 63 at its rearward end. The steering arm is supported immediately adjacent its rearward end by a cross arm 64 rotatably mounted in a pair of loops 65 and 66 secured to the forward edge of the platform. The cross arm is provided with a locking quadrant 67 thereon and a catch pin 70 on the platform 16. The L extension 63 is connected to a throttle arm 68 of the motor 28 by a chain linkage 69 and is retained in a "closed" position, in which the chain linkage 69 is held slack, by a coil spring 71 mounted on the loop 66. The tension of the spring is such that it may be manually overcome by twisting of the control handle 62.

The throttle arm 68 also is connected successively through a second chain linkage 72 and a flexible cable 73 to a position-retaining lever 74 of a throttle quadrant 75 secured on the rail 7 adjacent the steering wheel 58. Also adjacent the steering wheel 58 and in conventional relationship therewith, a seat 76 and footrest 77 are provided.

The provision of the chain linkages 69 and 72 permits the optional control of the unit by means of either the steering wheel 58 and throttle quadrant 75 or the steering arm 59 and control handle 62, without disconnection of either control linkage, and further permits the upward and downward rotation of the steering arm 59 without disturbance of the motor speed or the control linkage associated with the throttle quadrant 75. If it is desired to keep the unit in continuous motion, the control handle 62 is regulated by the picker with one hand, while the other hand is employed for continuous picking with one of the nozzles. The speed of the unit may be held at any desired point between maximum speed and a stopped condition by appropriate regulation of the control handle.

A pair of switches 78 and 79 are individually arranged on the steering arm 59 and adjacent the steering wheel 58, respectively, and are connected in parallel in a circuit 81 extending from a generator 82 of the motor 28, to a pair of individual electric brakes 83 and 84 mounted, respectively, on the wheels 9 and 10. The switches 78 and 79 are preferably of the spring-loaded, normally open type. A storage battery may be included in the motor and generator circuit, as in automotive practice, to supply current for starting the motor, or for operating the brakes, if necessary, when the motor is not running.

The sleeve 13 is provided with a projection or key 85 extending rearwardly from its lower region and centrally aligned with respect to the rails 6 and 7. The platform 16 carries a pair of upwardly extending pins 86 and 87, which are arranged in a transverse line adjacent and slightly forward of the center point or axis of the vertical shaft 14 and parallel to the axis of rotation of the traction wheel 19. The pins are arranged at distances from the center of the vertical shaft which are equal to the corresponding distance from the shaft center to the key 85, so that the pins 86 and 87 provide a 180° limit to oscillation of the platform 16 by interference of the pins with the key 85. The 180° range of oscillation of the traction unit provides for a very short turning radius for the picking unit, and the incorporation of the drive train on the oscillating platform precludes the need for complex "universal" linkages in the train.

As shown in Fig. 5, the switches 78 and 79 are connected in parallel to one side of the generator 82 by a line 88 and branch line 89, respectively. The opposite side of the generator is connected to corresponding terminals of the brakes 83 and 84 by a line 90 and branch line 91, respectively. The opposite brake terminals are connected, respectively, by a line 92 and branch line 93 to the second pole of the switch 79, and by a branch line 94 to the second pole of the switch 78. The brakes also may be provided with supplementary mechanical locks for parking.

In operation, and as the unit is to be driven from storage to the point of use, an operator uses the controls associated with the seat 76 and steering wheel 58. The motor 28 is started and upon rearward motion of the quadrant lever 74 and flexible cable 73, the chain linkage 72 is put under tension and moves the throttle arm 68 to increase the speed of the motor. At a preset motor shaft speed, the centrifugal clutch 29 engages and drives the transmission 35 through the multiple sheaves 34 and 37 and the V belts 38. During transit to the point of use, depending upon the roads to be travelled, a high speed output of the transmission 35 may be used to effect a saving in travel time. The transmission 35 delivers power to the traction wheel successively through the output shaft 41, sprocket 45, roller chain 50, double sprocket 48, roller chain 53 and sprocket 24.

When the unit is on site for the picking operation, the quadrant lever 74 is moved forward to close the motor throttle by producing slack in the chain linkage 72. The centrifugal clutch 29 is disengaged by the loss of motor shaft speed, thereby permitting shifting of the transmission to a speed range suitable for the picking operation.

When the shifting has been completed, and while the centrifugal clutch 29 remains disengaged by reason of the low motor speed, the steering arm 59 is swung to its forwardly extending position, and secured by the locking quadrant 67 and pin 70, and the picking apparatus is set into operation.

When the unit is to be moved forward to begin picking, the control handle 62 is rotated to put the chain linkage 69 under tension through the L extension 63, thereby opening the motor throttle through motion of the throttle arm 68. The resultant increase in motor speed causes the engagement of the centrifugal clutch 29, and drives the traction wheel 19 as described hereinbefore. The unit is steered into alignment with the cotton rows by transverse movement of the steering arm 59, within the limits of the key 85 moving between the pins 86 and 87. If the unit is to be stopped, the control handle 62 is either rotated in an opposite direction, to slacken the chain linkage 69, or is released and follows the effect of the coil spring 71 on the L extension 63, with both actions resulting in slackening of the chain linkage 69 and permitting the throttle arm to return to a closed position. As the motor speed is slowed, the centrifugal clutch is consequently disengaged, and the unit is allowed to stop. If the unit tends to continue or coast forward, or to roll backward, the circuit 81 to the brakes 83 and 84 may be momentarily closed by the switch 78 until the unit stops, whereupon it generally will be held in position by inertia and the depression of the wheels into the ground.

While the braking system disclosed is advantageous, it is to be understood that other braking systems are contemplated, such as means for braking the traction wheel or its drive mechanism.

As forward motion of the unit is required in order to follow the advancement of the picking nozzles, the control handle 62 is rotated to increase the motor speed, engage the centrifugal clutch 29, and drive the traction wheel forward.

During the picking operation, the unit may be moved forward either continuously or intermittently, depending on the rate of advancement of the picking operation, which may in itself depend upon the yield of cotton, and depending upon the gear and drive ratios employed in a given unit.

When the unit is to be returned over the road to storage, the throttle is closed by the described rotation of the control handle 62, disengaging the centrifugal clutch, and the steering arm is raised to its upper position and held by the locking quadrant 67 and pin 70. An operator thereupon controls the traction unit from the seat 76 as described hereinbefore, and uses the switch 79 to operate the brakes, as required.

Where desired, a less versatile traction unit may be arranged without the change-speed transmission, and the overall drive ratio designed for a picking-speed range only. This arrangement retains the advantages attendant to the picking operation, but detracts from the traction unit's value for higher speed transporting. Also, when obstacles such as ruts, humps, or curbs are encountered, the presence of the transmission 35 is advantageous in that it may be shifted to a "low gear," or higher overall gear ratio, to permit the motor to deliver maximum torque to the traction wheel for overcoming the obstacle.

Various changes may be made in the details of construction without departing from the scope of the invention or sacrificing any of the advantages thereof.

I claim:
1. A power traction unit comprising a frame, a platform supported from the forward end of said frame for oscillation about a vertical axis, a traction wheel support depending from said platform, at least one traction wheel supported by said support at the lower end thereof, a steering arm extending from the platform forwardly of the unit for oscillating the platform about said vertical axis, driving means mounted on the platform and oscillatable therewith, said driving means including a motor, a clutch and a power train for driving the traction wheel, said power train being connectible to the motor through said clutch, additional steering means carried by said platform, a throttle for the motor, a throttle control adjacent said additional steering means, and a second throttle control carried by said steering arm.

2. A power traction unit as set forth in claim 1, in which the steering arm is hollow and the throttle control means carried thereby is a rod extending therethrough and rotatable therein.

3. A power traction unit as set forth in claim 2, in which said additional steering means is located at least in part above the platform and which includes means for braking the traction wheel, and means carried by the forward end of the steering arm for causing actuation of the braking means.

References Cited in the file of this patent

UNITED STATES PATENTS

| | | |
|---|---|---|
| 2,387,159 | Lee | Oct. 16, 1945 |
| 2,513,718 | Gfrorer | July 4, 1950 |
| 2,531,041 | Henry | Nov. 21, 1950 |
| 2,680,338 | Space | June 8, 1954 |
| 2,697,491 | Burrus et al. | Dec. 21, 1954 |
| 2,704,158 | Long | Mar. 15, 1955 |
| 2,706,008 | Voigt | Apr. 12, 1955 |
| 2,744,582 | Sheppard | May 8, 1956 |
| 2,746,315 | Ertsgaard et al. | May 22, 1956 |
| 2,815,083 | Ellingsworth | Dec. 3, 1957 |